(12) United States Patent
Morimoto et al.

(10) Patent No.: US 6,936,934 B2
(45) Date of Patent: Aug. 30, 2005

(54) POWER GENERATING CONTROLLER OF A VEHICLE

(75) Inventors: Kazuhiko Morimoto, Hamamatsu (JP); Yoshiaki Omata, Hamamatsu (JP)

(73) Assignee: Suzuki Motor Corporation, Shizuoka-ken (JP)

(*) Notice: Subject to any disclaimer, the term of this patent is extended or adjusted under 35 U.S.C. 154(b) by 541 days.

(21) Appl. No.: 10/072,746

(22) Filed: Feb. 8, 2002

(65) Prior Publication Data

US 2002/0109407 A1 Aug. 15, 2002

(30) Foreign Application Priority Data

Feb. 14, 2001 (JP) ......................................... 2001-036843

(51) Int. Cl.$^7$ .................................................. B60L 1/00
(52) U.S. Cl. .................... 307/9.1; 180/65.2; 318/139 B
(58) Field of Search ........................ 180/65.2, 65.4; 318/139; 60/414; 307/9.1

(56) References Cited

U.S. PATENT DOCUMENTS

| | | | |
|---|---|---|---|
| 5,125,469 A | * 6/1992 | Scott ......................... | 180/65.2 |
| 5,212,431 A | * 5/1993 | Origuchi et al. ............ | 318/139 |
| 5,285,862 A | * 2/1994 | Furutani et al. ........... | 180/65.4 |
| 5,788,597 A | * 8/1998 | Boll et al. .................. | 477/4 |
| 5,839,533 A | 11/1998 | Mikami et al. | |
| 5,841,201 A | 11/1998 | Tabata et al. | |
| 5,895,333 A | 4/1999 | Morisawa et al. | |
| 5,935,040 A | 8/1999 | Tabata et al. | |
| 6,114,775 A | 9/2000 | Chung et al. | |
| 6,116,364 A | 9/2000 | Taguchi et al. | |
| 6,202,776 B1 | * 3/2001 | Masberg et al. ........... | 180/65.2 |
| 6,234,932 B1 | 5/2001 | Kuroda et al. | |
| 6,320,351 B1 | * 11/2001 | Ng et al. ..................... | 320/104 |
| 6,333,612 B1 | 12/2001 | Suzuki et al. | |
| 6,345,216 B1 | 2/2002 | Morimoto et al. | |
| 6,348,771 B1 | 2/2002 | Morimoto et al. | |
| 6,349,545 B1 | * 2/2002 | Bassanini et al. ............ | 60/705 |
| 6,362,580 B1 | 3/2002 | Omata et al. | |
| 6,369,539 B1 | 4/2002 | Morimoto et al. | |
| 6,373,206 B1 | 4/2002 | Morimoto et al. | |
| 6,443,126 B1 | 9/2002 | Morimoto et al. | |
| 6,504,259 B1 | * 1/2003 | Kuroda et al. ............. | 290/40 C |
| 2001/0028171 A1 | 10/2001 | Omata et al. | |
| 2001/0040060 A1 | 11/2001 | Morimoto et al. | |
| 2002/0028726 A1 | 3/2002 | Morimoto et al. | |

FOREIGN PATENT DOCUMENTS

| | | | |
|---|---|---|---|
| JP | 9-25864 | 1/1997 | |
| JP | 9-65504 | 3/1997 | |
| JP | 9-84210 | 3/1997 | |
| JP | 09252546 A | * 9/1997 | ........... H02J/7/16 |
| JP | 11-257120 | 9/1999 | |

* cited by examiner

*Primary Examiner*—Robert L. Deberadinis
(74) *Attorney, Agent, or Firm*—Flynn, Thiel, Boutell & Tanis, P.C.

(57) ABSTRACT

In a power generating controller of a vehicle, electric power of a first power supply, employed at engine startup and during vehicle driving, is conserved to decrease power needed for charging of the first power supply and to reduce engine load by operation of a generator. In addition, deceleration energy, which has not been utilized conventionally, can be recovered to a second power supply, which enables use of power generation (regeneration) during deceleration of the vehicle, during which fuel is not required, to improve efficiency of the generative operation of the generator.

16 Claims, 8 Drawing Sheets

INTERLOCKS OF SW1, SW2, SW3

IF SW1:ON (OFF), THEN SW2:OFF (ON)
IF SW3:ON, THEN SW2:OFF

|  | SW1 | SW2 | SW3 |
|---|---|---|---|
| IN PRECHARGING | ON | OFF | ON |
| IN NORMAL OPERATION | ON | OFF | OFF |
| IN REGENERATING OR WHEN POWER CAN BE SUPPLIED FROM CAPACITOR | OFF | ON | OFF |

INTERLOCKS OF SW1, SW2, SW3

IF SW1:ON (OFF), THEN SW2:OFF (ON)
IF SW3:ON, THEN SW2:OFF

|  | SW1 | SW2 | SW3 |
|---|---|---|---|
| IN PRECHARGING | ON | OFF | ON |
| IN NORMAL OPERATION | ON | OFF | OFF |
| IN REGENERATING OR WHEN POWER CAN BE SUPPLIED FROM CAPACITOR | OFF | ON | OFF |

POWER GENERATING CONTROLLER OF A VEHICLE

RELATED APPLICATIONS

This application is related to U.S. patent application Ser. No. 09/851,914 filed May 9, 2001, which is hereby incorporated by reference.

FIELD OF THE INVENTION

This invention relates to a power generating controller of a vehicle to recover deceleration energy during deceleration of the vehicle, when fuel is not required.

BACKGROUND OF THE INVENTION

Vehicles generally have an alternator which is a generator driven by an engine to supply power for the electric loads of an engine controller and other electric loads, such as a fuel injection system, lamps, blinkers, blower, wiper, air conditioner and the like. The alternator also is driven by the engine to charge, for example, a 12 volt vehicle battery at the same time.

Among vehicles there are so-called hybrid vehicles provided with an internal combustion engine driven by combustion of fuel, the engine being provided with a motor generator (motor) driven by electric energy and having a power generating function. The hybrid vehicles include an engine and a motor generator (motor) directly connected to the output axle of the engine. The hybrid vehicles further include a motor control means and an engine control means having controllers to control operating states of the engine and the motor, and these control means detect respective operating states of the engine and the motor while the vehicle is driven, and are controlled in association with one another. Such a control system attains a high level of required performance (such as fuel efficiency, lower values of detrimental components in exhaust gases, and improved power performance). A battery supplies driving power to the motor and is charged by power generated by the motor. Since a certain amount of battery charge must be conserved to operate required driving power-generation/driving prevention for the motor, a power-generation controller is provided to control the battery and the generating states of the alternator and the motor.

Some vehicles are of a type having an automatic stop/startup system (idle stop system) wherein the engine is automatically stopped when a predetermined automatic stop condition is satisfied while the engine is at idle. Then the engine is automatically started up when a predetermined automatic startup condition is satisfied while the engine is stopped, so that fuel efficiency and reduction in effluent gas are improved by stopping an engine forcibly when the engine is stopped in an idling state.

Examples of power generating controllers for a vehicle are disclosed in published Japanese Patent Laid-Open No. 9-65504, Japanese Patent Laid-Open No. 9-25864, and Japanese Patent Laid-Open No. 9-84210. A controller is disclosed in Japanese Patent Laid-Open No. 9-65504 for a hybrid vehicle having a motor/generator disposed between an engine and transmission, and a capacitor (condenser battery) connected to the motor/generator. The improved controller, before regenerative braking during deceleration, calculates a voltage between terminals which needs to be fully charged when the vehicle is stopped, and pre-charges the battery to prevent a fully charged state on braking and a lacking charge state during stop. A controller in Japanese Patent Laid-Open No. 9-25864 discloses that when parking the vehicle, main charging means charges a capacitor before stopping of an engine and, after the stop of the engine is detected, charges the capacitor at a rated voltage for a certain time such that the capacitor is close to the fully charged state even if charging of the capacitor is inadequate when the stop operation of the engine is detected. A controller is disclosed in Japanese Patent Laid-Open No. 9-84210 for a hybrid vehicle having a motor/generator disposed between an engine and transmission, and a capacitor (condenser battery) connected to the motor/generator. The motor/generator is assisted by a lower engine load as the charge quantity of the capacitor increases to achieve a suitable charge and a suitable power assist.

However, in a conventional vehicle, the alternator which is a generator driven by the engine, is driven as a part of the engine load, which increases fuel consumption, which is disadvantageous from an economical view point. On the other hand, deceleration energy during deceleration in which fuel is not required, has not been positively utilized and improvement thereof has been desired.

SUMMARY OF THE INVENTION

In order to obviate or at least minimize the above inconveniences and decrease fuel consumption, the present invention provides a power generating controller for a vehicle having an engine and a generator driven by the engine. The controller controls the power generating state of the generator. A deceleration detecting means detects deceleration of the vehicle. A first power supply, which is a main battery for the vehicle, remains connected at all times to receive power from the generator. A second power supply, which is a sub-battery for the vehicle, is connected to the generator only when a power supply connecting condition is satisfied. A switching means makes a connection between the generator and the second power supply when the vehicle is decelerating or when a charge quantity of the second power supply is greater than a predetermined value.

The present invention provides such a controller to make a connection between the generator and the second power supply when the vehicle is decelerating or when a charge quantity of the second power supply is greater than a predetermined value, which charges the second power supply while the vehicle is decelerating. Accordingly, the second power supply can be utilized as a power supply for electric loads (maintenance for the engine controller system or lamps and the like) when the engine is stopped after the vehicle is stopped (vehicle with the automatic stop/start-up system), or when the charge quantity of the second power supply is greater than a predetermined value. Thereby, the electric power of the first power supply, which is used at startup or during vehicle driving can be conserved, which can reduce power required for charging of the fist power supply, so that engine load by operation of the generator can be reduced to decrease fuel consumption. In addition, deceleration energy which has not been utilized conventionally can be recovered to the second power supply, which allows use of power generation (regeneration) during deceleration of the vehicle, in which fuel is not required, to improve efficiency of generative operation of the generator.

DETAILED DESCRIPTION

Figure 1:
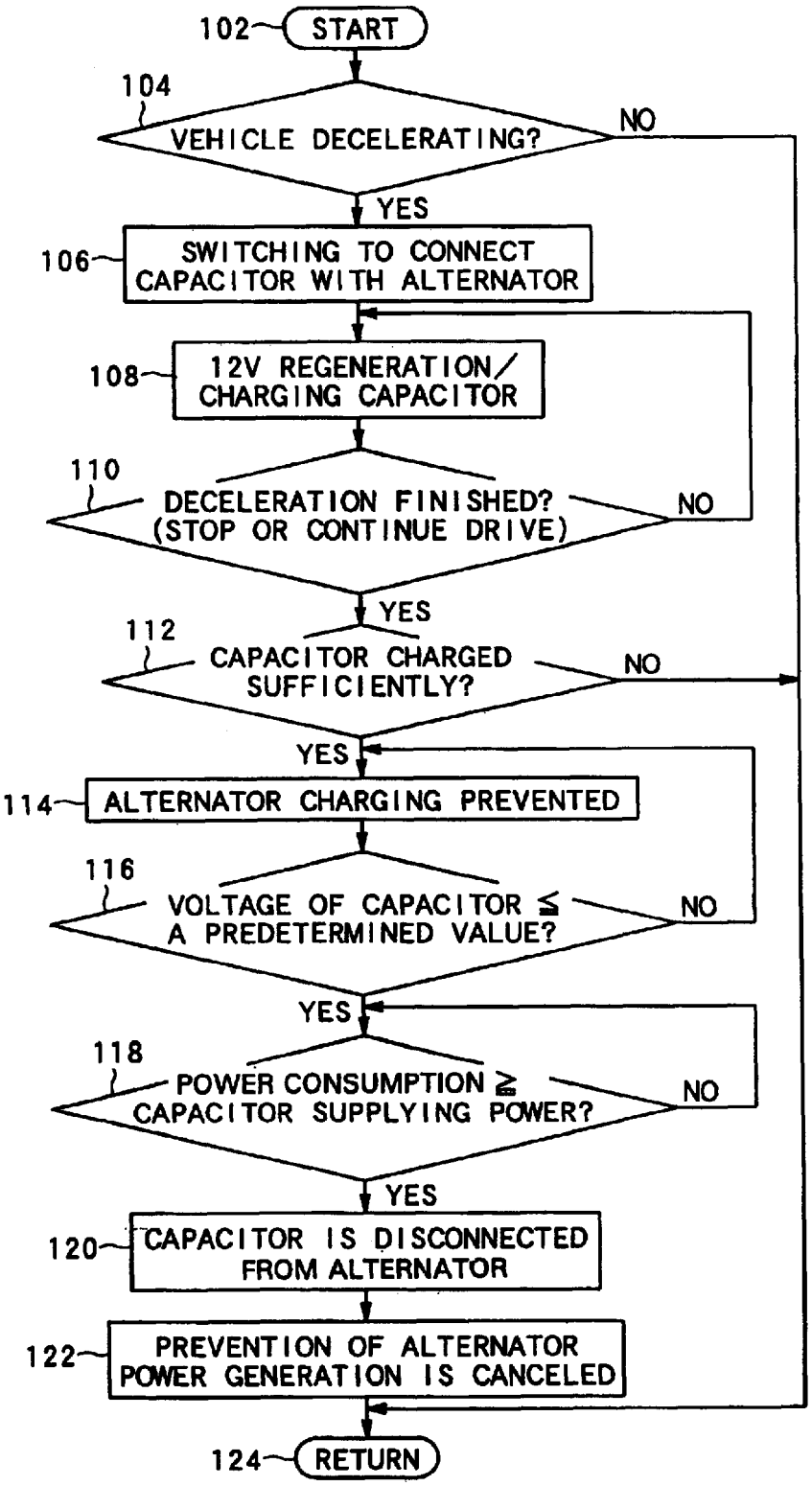
FIG. 1 is a flow chart of a power generating control.

The present invention will now be described in specific detail with reference to FIGS. 1–7, which illustrate a first embodiment of the invention. Referring to FIG. 7, a vehicle 2 includes an engine 4, a transmission 6, a clutch 8 disposed between the engine 4 and the transmission 6, an alternator (ALT) 10 for a 12 volt battery system generating electricity from driving of the engine 2, and an engine controller 12 for controlling the operating state of the engine 4. The engine controller 12 comprises an engine control means 14 connected with the engine 4, an automatic stop/startup system (idle stop system) 16, and a fuel cut (F/C) system 18.

The engine 4 is automatically stopped by the engine control means 14 when a predetermined automatic stop condition, such as a control of the automatic stop/start-up system 16, is satisfied while the engine 4 is idling, and the engine 4 is automatically started when a predetermined automatic startup condition is satisfied while the engine is stopped. In addition, fuel supply is stopped (cut), as a control of the fuel cut (F/C) system 18, by the engine control means 14 during deceleration of the vehicle 2 so as to reduce the fuel consumption.

The vehicle 2 includes a power generating and control system 20, which controls the power generating state of the alternator 10. The power generating and control system 20 includes an idle switch 22, a battery 24, a capacitor 26 and switching means 28. Specifically, the idle switch 22 is provided for detecting a decelerating state of the vehicle 2. The battery 24 as a first power supply is a main power supply for the vehicle (main power supply for the engine) and is continuously connected to the alternator 10. Further, the capacitor 26, as a second power supply, is a sub-battery (auxiliary power for engine) and is connected to the alternator only when a predetermined power supply connecting condition is satisfied. Still further, the switching means 28 connects the alternator 10 with the capacitor 26 when the vehicle 2 is decelerating or when a charge quantity of the capacitor 26 is greater than a predetermined value. The battery 24 includes a conventional 12 volt battery, and is connected with the alternator at all times in every operating state. The capacitor 26 comprises a condenser battery, and is in connection with the alternator 10 only when a predetermined power supply connecting condition is satisfied. The switching means 28 is connected to the electric load (LOAD) 30 for maintenance of the engine control system and actuation of lamps. The idle switch 22 is turned "ON" when the engine 4 is idling, detects vehicle deceleration, by switching to the "ON" state from the "OFF" state.

The engine controller 12 has sensors connected thereto such as an ignition switch 32, a speed sensor 34, an engine speed sensor 36, and the like. The engine controller 12 receives output power from alternator 10, voltage of battery (VB) 24, and voltage of capacitor (VC) 26.

Figure 6:
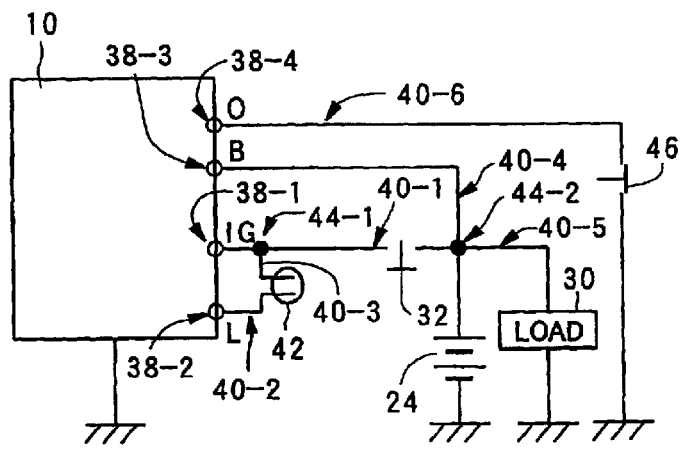
FIG. 6 shows a charging circuit for an alternator.
Figure 7:
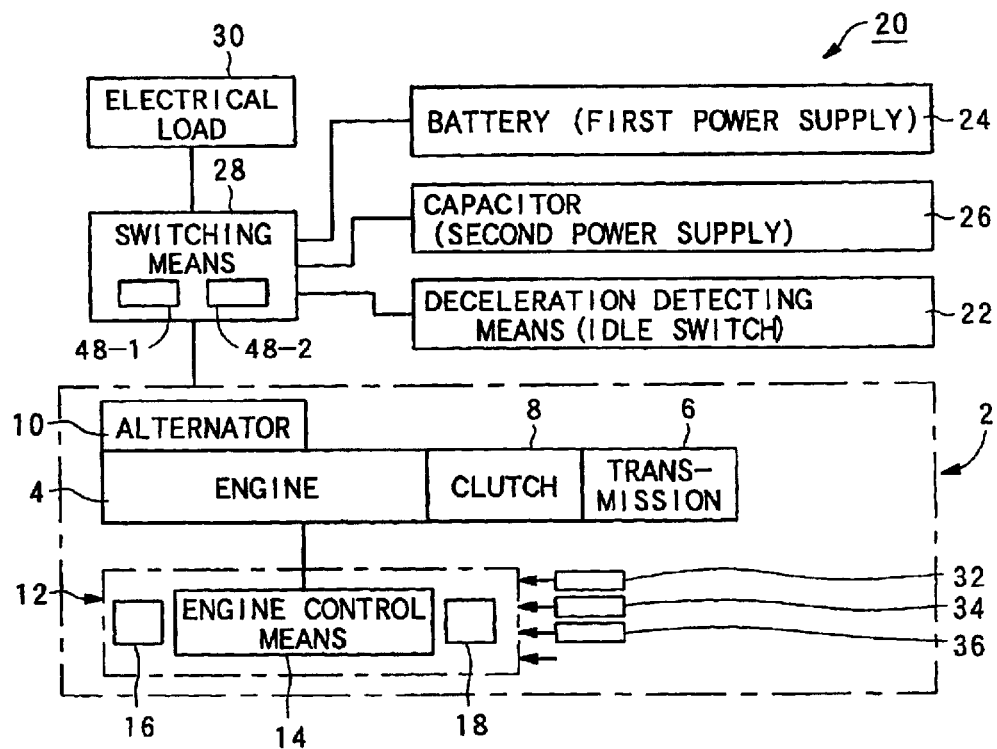
FIG. 7 is a block-diagram of a vehicle and a power generating controller according to a first embodiment of the invention.

Referring to FIG. 6, the alternator 10 is connected at a first terminal (IG) 38-1 with a first connection line 40-1 in connection with the battery 24, and is connected at a second terminal 38-2 (L) with a second connection line 40-2. The first connection line 40-1 has the ignition switch 32 near a midpoint thereof. A charge lamp 42 is connected with the second connection line 40-2 on one side thereof and with a third connection line 40-3 on the other side thereof. The third connection line 40-3 is connected to a first node 44-1 of the first connection line 40-1 between the first terminal 38-1 and the ignition switch 32. A third terminal 38-3 (B) has voltage impressed (precharged) during charging of capacitor 26, and is connected with a fourth connection line 40-4 which further connects to a second node 44-2 of the first connection line 40-1. The ignition switch 32 is located between the second node 44-2 and the first terminal 38-1. The second node 44-2 is also connected with a fifth connection line 40-5 in connection with the electric load 30. A fourth terminal 38-4(C) controls power generation (whether generation occurs) and the quantity of generating power output, and is connected with a sixth connection line 40-6 which connects to a voltage control switch 46.

Figures 4, 5:
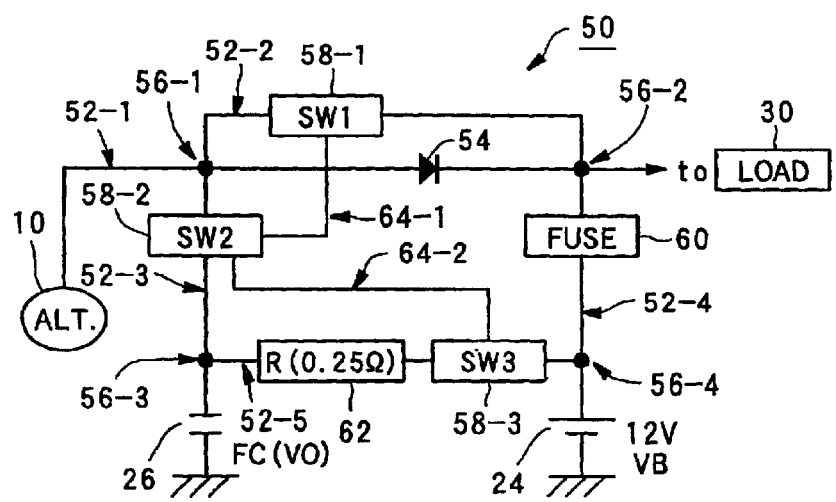
FIG. 4 is a block-diagram of a capacitor connecting circuit.
FIG. 5 shows "ON/OFF" modes for the interlocking switches.

The switching means 28 includes switching sections 48-1, 48-2 as shown in FIG. 7, and a charging circuit 50 in which the battery 24 is not disconnected from the electric load 30 as shown in FIG. 4. In other words, referring to FIG. 4, the charging circuit 50 includes a first signal line 52-1 which connects the alternator 10 with the electric load 30 and which has a diode 54 near a midpoint of the signal line 52-1. A second signal line 52-2 is connected at one end thereof to a first node 56-1 of the first signal line 52-1 between the alternator 10 and the diode 54, and is connected at the other end thereof to a second node 56-2 of the first signal line 52-1 between the diode 54 and the electric load 30. The second signal line 52-2 has a first switch (SWI) 58-1 near a midpoint thereof.

The first node 56-1 of the first signal line 52-1 is connected with a third signal line 52-3 which connects to the capacitor 26. The third signal line 52-3 has at a midpoint thereof, a second switch (SW2) 58-2 forming a first switch section 48-1. In addition, the second node 56-2 of the first signal line 52-1 is connected with a fourth signal line 52-4 which connects to the battery 24. The fourth signal line 52-4 has a fuse (FUSE) 60 near a midpoint thereof.

Further, a fifth signal line 52-5 connects at one end thereof to a third node 56-3 of the third signal line 52-3 between the second switch 58-2 and the capacitor 26, and connects at the other end thereof to a fourth node 56-4 between the fuse 60 and the battery 24. The fifth signal line 52-5 has, near the midpoint thereof, a resistor (0.25 Ù) 62 and a third switch (SW3) 58-3 in this order from the third node 56-3 side. The third switch 58-3 forms a second switch section 48-2. The switches 58-1, 58-2 are connected through a first interlock line 64-1 and switches 58-2, 58-3 are connected through a second interlock line 64-2.

The switches 58-1, 58-2, 58-3 all interlock together as shown in FIG. 5. Turning of the first switch 58-1 "ON" turns the second switch 58-2 "OFF", and vice versa. Turning of the third switch 58-3 "ON" turns the second switch 58-2 "OFF". When voltage is impressed (precharged) at the third terminal 38-3 (B) of the alternator 10 during charging of the capacitor 26, then the first switch 58-1 is turned on, the second switch 58-2 off, and the third switch 58-3 on. In a normal operation, the first switch 58-1 is turned on, the second switch 58-2 off, and the third switch 58-3 off. Furthermore, while charging (regenerating) during deceleration, or when the electrical power can be supplied from the capacitor 26, the first switch 58-1 is turned off, the second switch 58-2 on, and the third switch 58-3 off.

In addition, the switching means 28 of the power generating controller 20 prevents the alternator 10 from generating power when engine 4 restarts after the vehicle 2 is decelerated and stopped and the engine 4 is stopped.

The switching means 28 of the controller 20 also prevents the alternator 10 from generating power when a charge quantity of the capacitor 26 is greater than a predetermined value.

Furthermore, the switching means 28 of the controller 20 employs the battery 24 as a power supply at start-up of the engine 4.

The capacitor 26 is employed as a power supply of the electric load 30 of the vehicle 2 only when the stored voltage is greater than a predetermined voltage.

The switching means 28 of the power generating controller 20 switches such that the capacitor 26 is connected with the alternator 10 by the first switch section 48-1 only when a predetermined power supply connecting condition is satisfied, and such that the battery 24 is connected with the capacitor 26 by the second switch section 48-2 only when a predetermined power supply connecting condition is satisfied. The switching means 28 also switches between the switch sections 48-1, 48-2 such that the alternator 10 and the capacitor 26 are not connected when the battery 24 and the capacitor 26 are connected.

Figure 2:
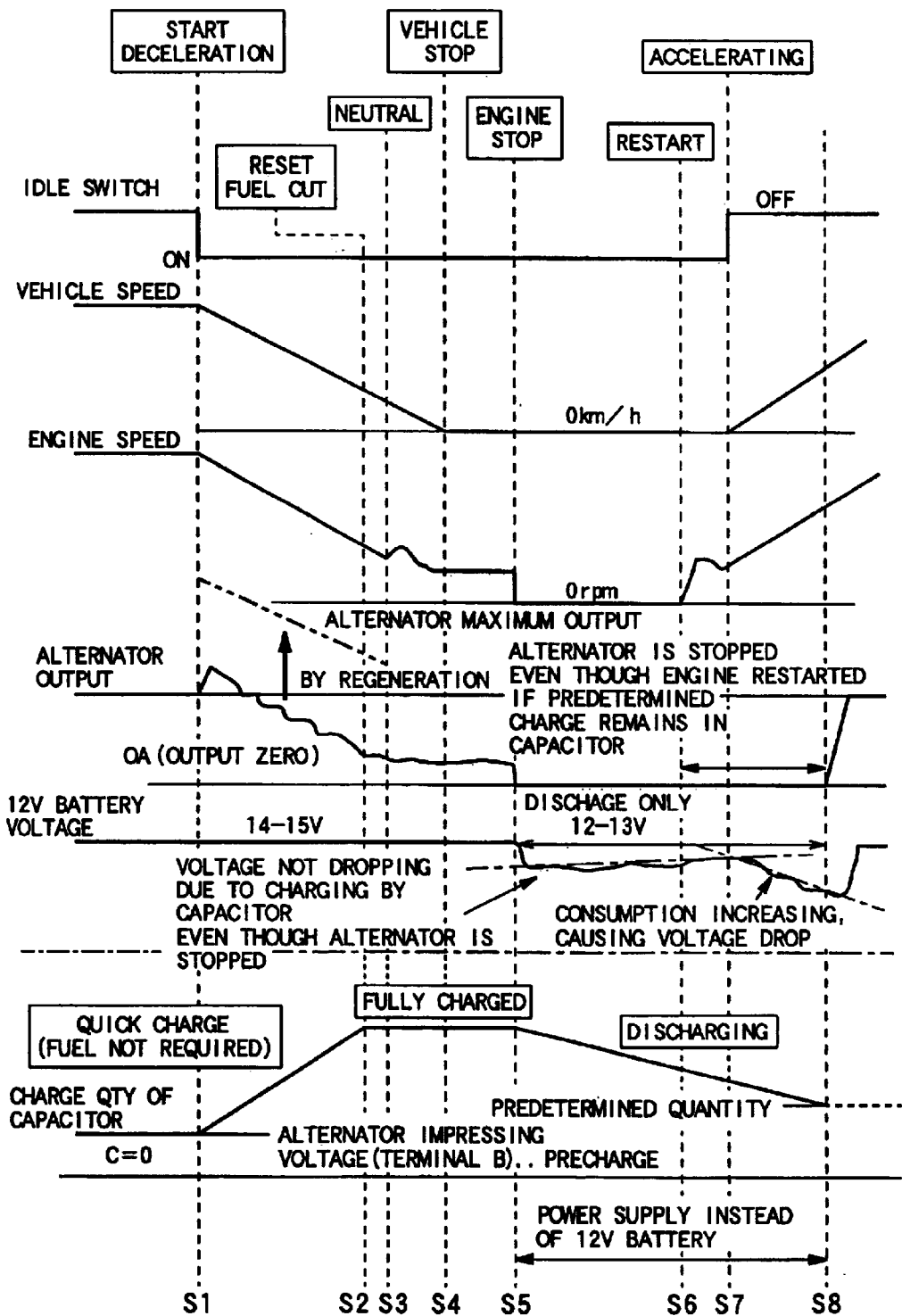
FIG. 2 is a timing chart of a power generating control.

Next, an explanation will be given as to the operation of the first embodiment with reference to a flow chart in FIG. 1, a timing chart in FIG. 2, and a timing chart showing the switch timing of switches 58-1, 58-2, 58-3 in FIG. 3.

First, the embodiment is explained with reference to a flow chart in FIG. 1.

A controlling program of the power-generating controller 20 starts control at step 102. Then a determination is made at step 104 as to whether the vehicle 2 is decelerating with the fuel cut system 18 cutting the fuel supply, that is, whether the idle switch 22 is turned "ON". At this time, the alternator 10 is not in connection with the capacitor 26 but with the battery 24.

When the determination in step 104 is "YES", then the connection of the alternator 10 is switched, that is, the alternator 10 connected to the battery 24 is switched to be disconnected therefrom and connected to the capacitor 26 at step 106.

Accordingly, the capacitor 26 is instantly charged at step 108 by twelve volt alternator 10, the charge (regeneration) occurring during deceleration, in which fuel is not required.

Also, a determination is made at step 110 as to whether deceleration of the vehicle 2 is finished, that is, whether the engine 4 is automatically stopped by the control of the automatic stop/start-up system 16 when a predetermined automatic stop condition is satisfied after the vehicle 2 is stopped, or whether the vehicle 2 is in a driving state that can be maintained. When the determination at step 110 is "NO", then the routine returns to step 108.

When the determination at step 110 is "YES", then a determination is made at step 112 as to whether the capacitor 26 is charged sufficiently by the 12V alternator charge (regeneration) during deceleration.

When the determination at step 112 is "YES", the alternator 10 is prevented from generating power at step 114, and electric power is directly supplied from the fully charged capacitor 26, instead of the battery 24, for electric loads 30, such as maintenance of the engine controller system, powering of lamps, and the like.

After the engine 4 is automatically started up by the automatic stop/startup system 16 when a predetermined automatic start-up condition is satisfied, then a determination is made at step 116 as to whether the voltage of the capacitor 26 is less than a predetermined value. When the determination at step 116 is "NO", the routine is returned to step 114.

When the determination in step 116 is "YES", then a determination is made at step 118, as to whether the quantity of power that capacitor 26 supplies is less than the power that the electric load 30 consumes. When the determination at step 118 is "NO", the routine continues the determination.

When the determination in step 118 is "YES", then the capacitor 26 is disconnected from the alternator 10 at step 120. Until electric power stored in the capacitor 26 is consumed, (regardless of start-up of the engine 4, acceleration of the vehicle 2, or normal driving of the vehicle 2) prevention of power generation by the alternator 10 is not lifted (cancelled). That is, alternator 10 starts power generating at step 122.

Thus, after the saved electrical power discharged from the capacitor 26 is consumed, the alternator 10 is activated (for power generation) to supply electric power for the electric load 30 and to charge the battery 24 as before.

Then the routine is returned at step 124. When the determination at step 104 or step 112 is "NO", the routine is directly returned at step 124.

Next, the embodiment is explained with reference to a timing chart in FIG. 2.

In the fuel cut system 18 of vehicle 2, when idle switch 22 is turned "ON" from an "OFF" state with the fuel supply stopped, the vehicle 2 is decelerated (see S1 in FIG. 2) and connection of the alternator 10 is switched. That is, the alternator 10 connected with the battery 24 is switched to be disconnected therefrom and connected with the capacitor 26. Until this deceleration starts, charge quantity of the capacitor 26 is conserved to a target precharged value, or a predetermined value.

Accordingly, although engine speed decreases according to the vehicle deceleration in which fuel is not required, battery 24 voltage is maintained within the range from 14 volts to 15 volts, and the alternator 10 is then turned to maximum output until fuel cut is cancelled (reset) (S2 in FIG. 2) by charging (regeneration) during deceleration. The capacitor 26 is then charged by the alternator 10 at maximum power generation capability and is instantly fully charged (S1, S2). Since capacitor 26 is precharged at system initial state, the capacitor 26 stores an impressing voltage of 6–8 volts for the third terminal 38-3 (B) of the alternator 10 during charging of the capacitor 26.

The transmission 6 is in neutral position (S3) during deceleration of the vehicle 2 after fuel cut is cancelled (S2). Engine speed increases slightly and afterwards decreases gradually, since engine load is reduced when the fuel cut is cancelled (S2).

Then, when vehicle 2 is stopped and vehicle speed decreases to zero (S4) and a predetermined automatic stop condition of automatic stop system 16 is satisfied to automatically stop the engine 4 (S5) with the ignition switch 32 off, then engine speed decreases to zero, output power of the alternator 10 also decreases gradually to zero, and the capacitor 26 is turned to be in a discharging condition with power generation of the alternator 10 stopped and, instead of the battery 24, the capacitor 26 supplies operating power for the electric load 30 such as maintenance of the engine controller system and lamp. At this time, the battery voltage does not decrease according to increase in the voltage of the capacitor 26 even as the alternator 10 stops its operation. Battery 24 is rather in the charged state. Alternately, electric power for system maintenance or lamps can be supplied from the battery 24 as usual. In this case, current drain of the battery 24 is prevented by charging assistance from the capacitor 26 thereto.

When engine 4 is restarted by the automatic stop/start-up system 16 as a predetermined automatic startup condition is satisfied (S6), then the engine speed increases, and the capacitor 26 supplies electric power to decrease engine load with the alternator 10 stopped if there is remaining charge in the capacitor 26.

When the idle switch 22 turns "OFF" from "ON" state after engine 4 is started (S7), vehicle speed and engine speed increase. At this time, although voltage of the battery 24 drops and charge quantity of the capacitor 26 decreases gradually, electric power stored in the capacitor 26 is supplied until voltage of the capacitor 26 becomes a predetermined value, so that the alternator 10 can be stopped from power generating to reduce engine load.

When a charge quantity of capacitor 26 is at a predetermined value (charge quantity) (S8), the alternator 10 is driven to increase voltage of the battery 24 as usual.

Figure 3:
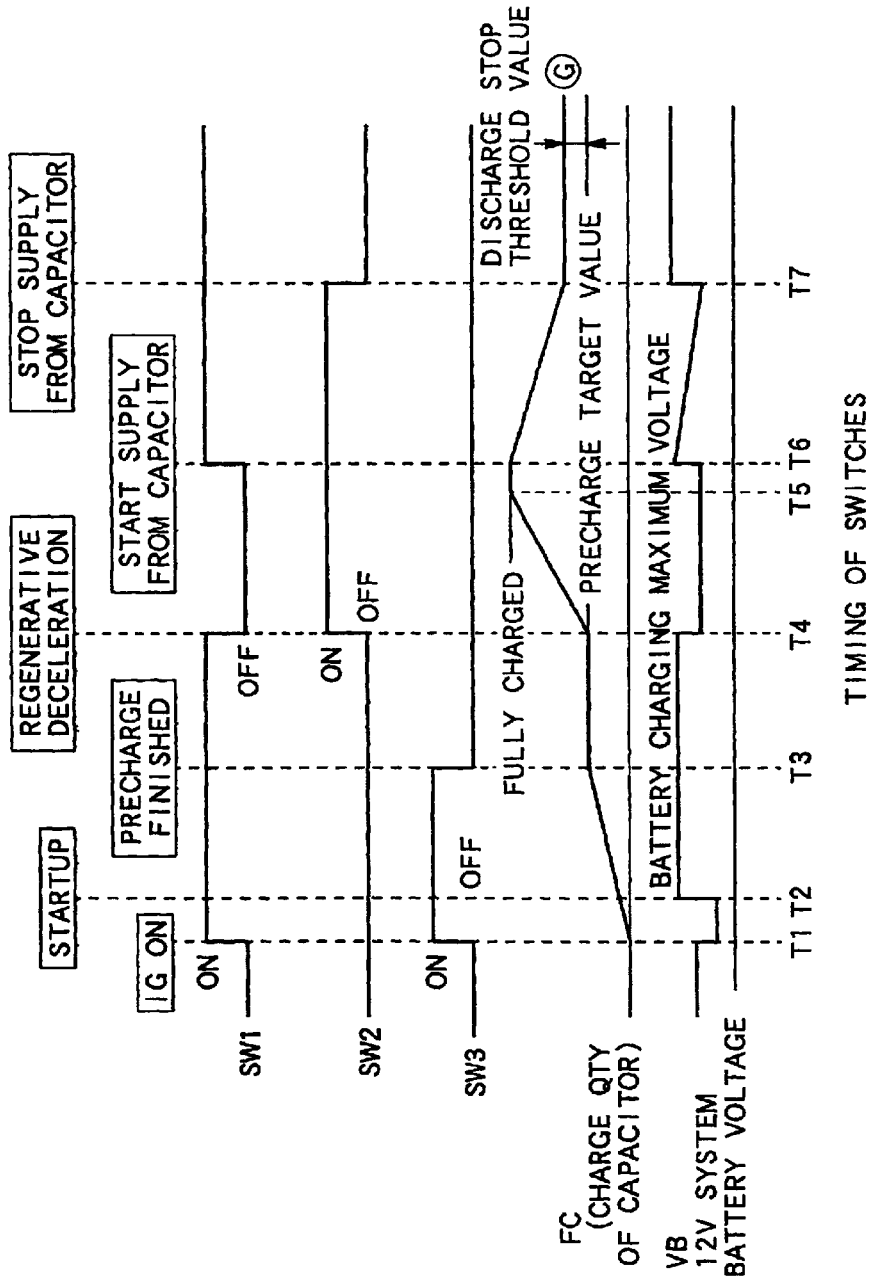
FIG. 3 is a timing chart of switching timing for each switch.

Furthermore, now the embodiment is explained with reference to FIG. 3 showing the switching timing chart of switches 58-1, 58-2, 58-3.

When the ignition switch 32 is turned on (see T1 in FIG. 3), the first switch 58-1 (SW1) is turned on, the second switch 58-2 (SW2) stays off, and the third switch 58-3 (SW3) is turned on. At this time, voltage of the battery 24 drops slightly and, charge quantity of the capacitor 26 begins to increase by precharging.

When engine 4 is started (T2), charging voltage to battery 24 reaches a maximum voltage.

When charge quantity of the capacitor 26 reaches a precharge target value, or a predetermined value, the third switch 58-3 is turned "OFF" (T3).

When the first switch 58-1 is turned "OFF" and the second switch 58-2 is turned "ON", that is when charging the capacitor 26 (regeneration) during deceleration (T4), the voltage of the battery 24 drops to a certain uniform level, and a charge quantity of the capacitor 26 increases gradually to be fully charged (T5).

When the first switch 58-1 (SW1) is turned "ON" to begin supply of the electric power from capacitor 22 (T6), charge quantity of the capacitor 26 decreases gradually by discharge, while the voltage of the battery 24 increases temporarily to maximum voltage and then decreases gradually.

When the charge quantity of the capacitor 26 reaches a discharge threshold value, which is a predetermined value and the second switch 58-2 is turned "OFF" (T7), capacitor 26 is stopped from supplying electric power, whereas voltage of the battery 24 is maintained at a maximum voltage. The discharge threshold value is set at a charge quantity G which is slightly higher than the precharge target value as shown in FIG. 3.

Thus, in the first embodiment, when the vehicle 2 with the automatic stop/startup system 16 detects deceleration thereof, the alternator 10 connected to the battery 24 through a charging circuit 50 thereof, is switched to be connected to the capacitor 26 to instantly charge the capacitor from the alternator's maximum power generation ability.

Then after vehicle 2 is stopped and the engine 4 is automatically stopped by the automatic stop/startup system 16 because a predetermined automatic stop condition is satisfied, electric power for the electric load 30, such as maintenance of the engine controller system and lamps, is directly supplied from the fully charged capacitor 26. Alternatively, the battery 24 supplies operative electric power for the electric load 30, and the capacitor 26 assistively charges the battery 24 to prevent battery drain. Battery supply from the capacitor 26 to the battery 24 is stopped when voltage of the capacitor 26 drops below a predetermined value.

When the engine 4 is automatically restarted by the automatic stop/startup system 16 because a predetermined restart condition is satisfied, and when stored voltage of the capacitor 26 drops below a predetermined value, the capacitor 26 is disconnected from the alternator 10.

When voltage of capacitor 26 is higher than a predetermined value after this startup of the engine 4, alternator 10 is prevented from generating power, and electric power for electric loads 30, such as maintenance of the engine controller and power for lamps, is supplied from the stored capacitor. Also, when voltage of the capacitor 26 drops below a predetermined value after startup of the engine 4, capacitor 26 is disconnected from the alternator 10, and the alternator 10 is prevented from operating until electric power saved by discharge of the capacitor 26 is consumed. This prevention of alternator operation may be executed at any of a) start-up of the engine 4, b) during acceleration of the vehicle 2, or c) in usual driving of the vehicle 2.

Then after electric power saved by discharge of capacitor 26 is consumed, alternator 10 is activated to supply the electrical load 30 with the power the alternator 10 generated and to charge the battery 24.

When vehicle 2 is stopped and the ignition switch 32 is turned off to stop the engine 4, capacitor 26 is kept in connection with the battery 24 and charges the battery 24 while the vehicle 2 is stopped.

In addition, while charging (regenerating) during deceleration of the vehicle 2, when the vehicle 2 is accelerated again to be in a running state and electric power stored in the capacitor 26 is sufficient, the alternator 10 is prevented from operating until the voltage of the capacitor 26 drops to a predetermined value. When voltage of the capacitor 26 drops to a predetermined voltage, then the capacitor 26 is disconnected from the alternator 10 which starts power generation.

Accordingly, capacitor 26 thus can recover the deceleration energy during deceleration of the vehicle 2 which has conventionally been wasted, thereby reducing engine load by alternator 10, that is, regenerative driving by the alternator 10 is executed positively. In addition, the engine 4 can not be stopped by a conventional automatic stop/startup system in some cases according to the state of the engine load 30. However, a 12 volt system power supply battery 24 has allowance, so that an automatic stop/startup system 16 of this embodiment can be improved in operative frequency (stop frequency), which reduces fuel consumption.

In this case, consumption current needs to be supplied, for example, five amps for maintenance of automatic stop/startup system 16 at engine 4 idle driving stopped, five amps for a stop lamp which illuminates when the brake pedal (not shown) is depressed, three amps for an illuminating blinker lamp, three amps for turning a radio on, six amps for a blower (Low), and 10–20 amps for the alternator 10. On the other hand, the alternator 10 can output 50–60 amps at about 14 volts. Accordingly, alternator 10 has an allowance of 30–40 amps when battery 24 is in a normal condition. This allowance of 30–40 amps in alternator 10 is stored by the capacitor 26 when charging (regeneration) during deceleration of the vehicle 2 occurs. Moreover, the alternator 10 can be controlled for its power-generation (whether it generates or not) or quantity of generating power at the fourth terminal 36-4 (C).

As a result, when the vehicle 2 is decelerating or when charge quantity of the second power supply capacitor 26 is greater than a predetermined value, the second power supply capacitor 26 is connected with the alternator 10, which is a generator, thereby charging the capacitor 26 sufficiently during deceleration of the vehicle 2. The capacitor 26 can be employed to power the engine load 30 (such as engine controller system, lamps, and the like) during stopping of the engine 4 after the vehicle 2 is stopped (in cases where the vehicle includes an automatic stop/start-up system 16), or when the charge quantity of the capacitor 26 is greater than a predetermined value. As a result, electric power of the first power supply battery 24 employed at startup of the engine 4 and traveling of the vehicle 2, can be conserved to reduce power for charging the battery 24, which decreases engine load by operation of the alternator 10 and results in improved fuel consumption. In addition, the deceleration energy that has not been utilized conventionally, can be recovered by capacitor 26, which improves efficiency of regenerative driving of the alternator 10 by using power generation (regeneration) during deceleration of the vehicle 2, in which fuel is not required.

In addition, switching means 28 of power generating controller 20 switches such that alternator 10 is prevented from generating power when the engine 4 is restarted at engine stop after deceleration of the vehicle 2 and when a charge quantity of the capacitor 26 is greater than a predetermined value. The sufficiently charged capacitor 26 can always assist as an auxiliary power supply for battery 24, thereby preventing discharge or deterioration of the battery 24 to provide improved system and product quality.

Furthermore, switching means 28 of power generating controller 20 switches such that alternator 10 is prevented from generating power when charge quantity of the capacitor 26 is greater than a predetermined value, so that alternator 10 can be prevented from generating power in a state when capacitor 26 is fully charged, which reduces load on engine 4 by power generating alternator 10 to improve fuel consumption.

Still further, the switching means 28 of power generating controller 20 switches to use battery 24 as a power supply at start up of the engine 4, so that stored charge from battery 24 can be employed at start up of the engine 4 to improve startability of the engine, stability of the engine controller, and product quality.

In addition, since capacitor 26 is employed as a power supply for electrical load 30 of the vehicle 2 only when higher than a predetermined voltage, battery 24 which is usually employed at engine startup can comprise a storage battery of larger capacity, and capacitor 26 which must be charged in a short time, such as during a vehicle deceleration can comprise a capacitor of lower internal resistance, so that vehicle 2 can make full use of the characteristics of each power supply.

Furthermore, since vehicle 2 includes an automatic stop/start-up system 16 which stops engine 4 during stopping of driving, such as waiting for a green light at a traffic signal, working conditions with respect to a power supply become severe in a vehicle having a single power supply. However in this embodiment, the capacitor 26 provides another power supply which can be utilized during engine stop to improve startability of engine 4.

Further, capacitor 26 is employed as a power supply for the electrical load 30 only when the voltage of the capacitor 26 is higher than a predetermined value. That is, capacitor 26 is not employed as a power supply when the voltage thereof is less than a predetermined value (in a state not charged enough), which avoids a fault operation in the electrical load 30 so that electrical equipment is stabilized to improve operation of the vehicle.

In addition, the switching means 28 of power generating controller 20 switches to make a connection between the alternator 10 and the capacitor 26 using the first switch section 48-1 only when a predetermined power supply connecting condition is satisfied, and switches to make a connection between the battery 24 and the capacitor 26 using the second switch section 48-2 only when a predetermined power supply connecting condition is satisfied, and switches between switch sections 48-1, 48-2 to not connect capacitor 26 with the alternator 10 when the battery 24 and the capacitor 26 are connected. As a result, the capacitor 26 is precharged so that the capacitor 26 can always be charged when a power supply connecting condition is satisfied. Therefore, the capacitor 26 can be directly charged when the alternator 10 is connected thereto by the switching means 28. In addition, controlling by two switching sections 48-1, 48-2 improves reliability of the switching operation.

Figures 8, 9:
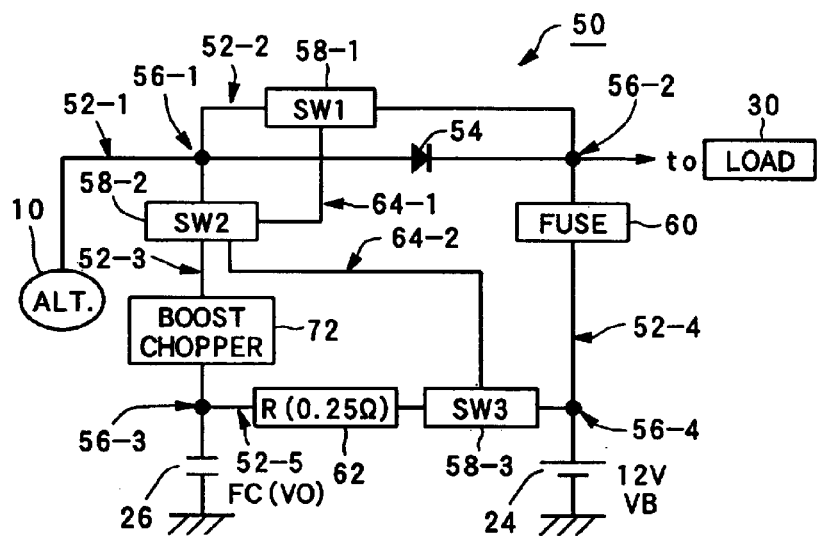
FIG. 8 is a block-diagram of capacitor connecting circuit according to a second embodiment of the invention.
FIG. 9 shows "ON/OFF" of each interlocking switch of the second embodiment.
Figure 10:
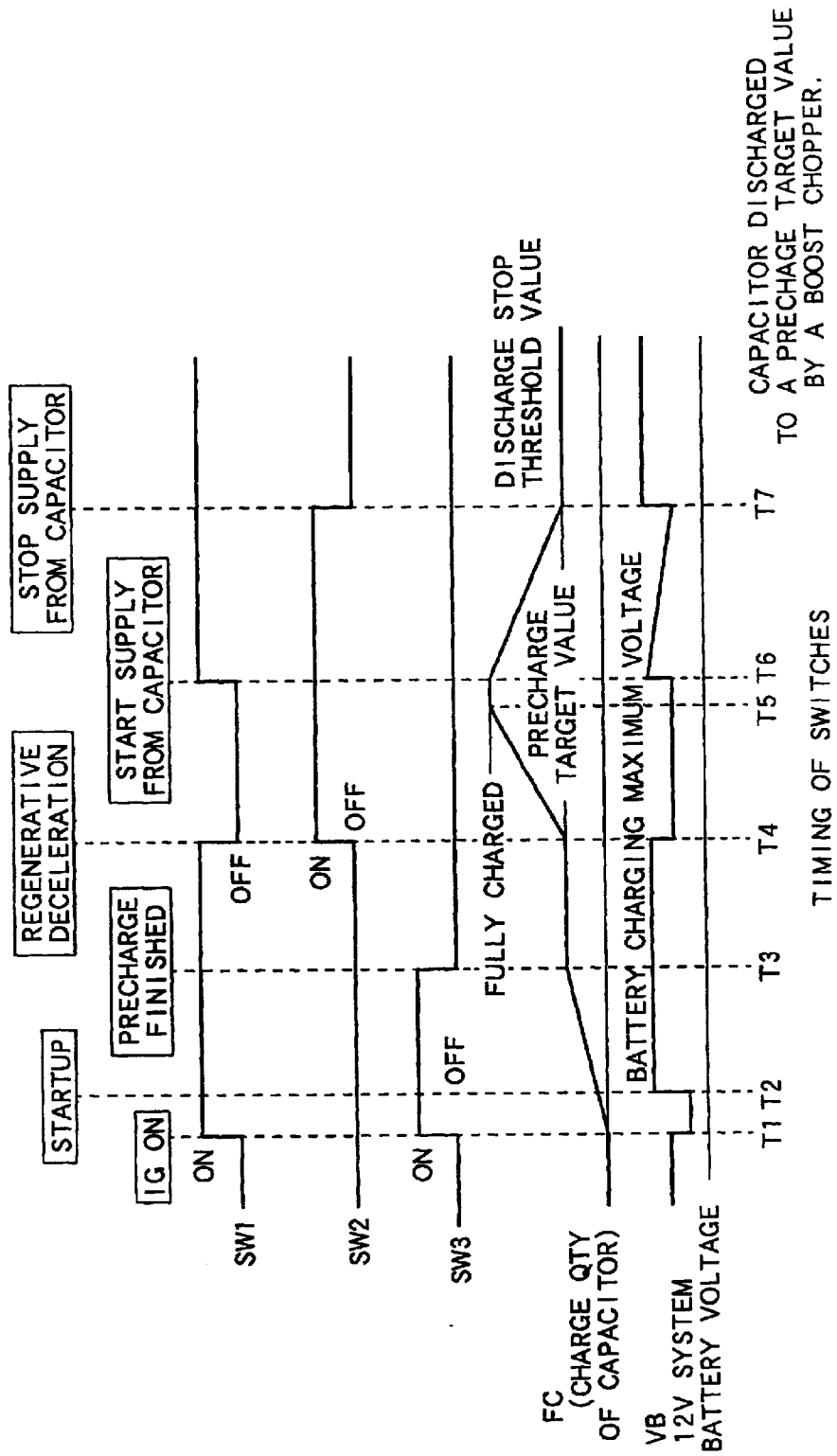
FIG. 10 is a timing chart of switching timing for each switch of the second embodiment.

FIGS. 8–10 illustrate a second embodiment of the present invention. The same reference characters are hereinafter utilized for features identical in function to those described in the first embodiment.

The second embodiment is characterized in that the battery 24 and the electric load 30 are not disconnected in the charging circuit 50 having alternator 10 as shown in FIG. 8 and that a boost chopper 72 is disposed on the third signal line 52-3 between the second switch 58-2 and the third node 56-3.

As shown in FIG. 9, each of the switches 58-1, 58-2, 58-3 interlocks as in FIG. 5 of the first embodiment. Turning of the first switch 58-1 "ON" turns the second switch 58-2 "OFF", and vice versa. Turning of the third switch 58-3 "ON" turns the second switch 58-2 "OFF". When voltage is impressed (precharged) at the third terminal 38-3 (B) of the alternator 10 during charging of the capacitor 26, then the first switch 58-1 is turned on, the second switch 58-2 off, and the third switch 58-3 on. In a normal operation, the first switch 58-1 is turned on, the second switch 58-2 off, and the third switch 58-3 off. Furthermore, while charging (regenerating) during deceleration, or when the electrical power can be supplied from the capacitor 26, the first switch 58-1 is turned off, the second switch 58-2 on, and the third switch 58-3 off.

According to the second embodiment, as shown in FIG. 10, the boost chopper 72 can set a discharge stop threshold value for capacitor 26 to a value equal to a precharge target value (precharge level) so that capacitor 26 can be discharged effectively.

Figure 11:
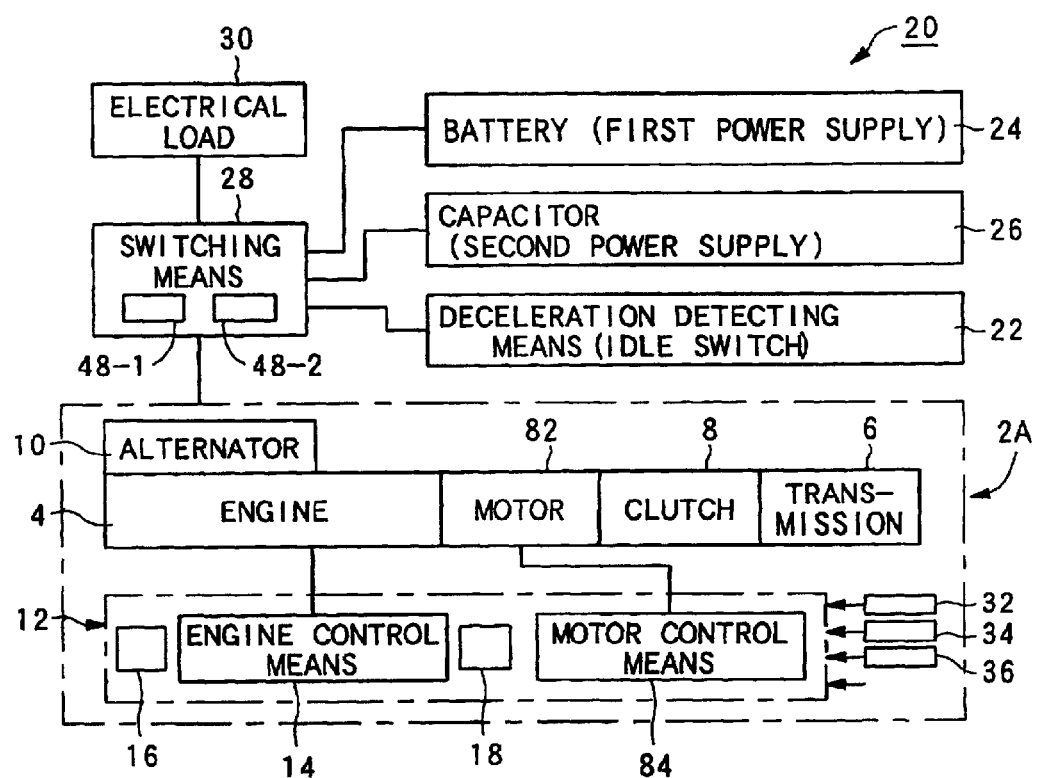
FIG. 11 is a block diagram similar to FIG. 7, but showing a third embodiment of the invention.

FIG. 11 illustrates a third embodiment of the present invention.

The third embodiment is characterized in that the vehicle comprises a hybrid vehicle 2A. The hybrid vehicle 2A comprises an alternator 10 as a first generator for engine 4 and a motor generator (motor) 82 as a second generator between the engine 4 and a clutch 8. The motor generator 82 is directly connected to the output shaft (not shown) of the engine 4, and has driving and generating functions, and is controlled by the motor control means 84 of the engine controller 12.

According to the third embodiment, as in the first embodiment, when vehicle 2A is decelerating or when charge quantity of the second power supply capacitor 26 is greater than a predetermined value, the second power supply capacitor 26 is connected with the alternator 10 and/or with the motor generator 82, thereby charging the capacitor 26 sufficiently during deceleration of vehicle 2. The capacitor 26 can be employed for engine load 30 (such as an engine controller system, a lamp, and the like) during stopping of the engine 4 after the vehicle 2A is stopped (when the vehicle includes an automatic stop/start-up system 16), or when the quantity of capacitor 26 is greater than a predetermined value. As a result, electric power of the first power supply battery 24 employed at startup of the engine 4 and traveling of the vehicle 2A, can be conserved to reduce power needed for charging the battery 24, which decreases engine load by operation of the alternator 10 and/or the motor 82 and results in reduced fuel consumption. In addition, the deceleration energy that has not been utilized conventionally, can be recovered to the capacitor 26, which improves efficiency of regenerative driving of the alternator 10 and/or the motor 82 by using power generation (regeneration) during deceleration of the vehicle 2A in which fuel is not required.

The present invention is not limited to the above-mentioned embodiments, but is suitable to many possible modifications and variations.

For example, a vehicle including the automatic stop/startup system (idle stop system) for a 12 volt system battery and a hybrid vehicle are explained in the above embodiment. However, the present invention is not limited to those vehicles, and can be applied to other types of vehicle to improve fuel consumption.

In addition, the present invention can be applied to batteries of different voltages. For example, the storage battery can have a higher voltage, such as 24, 36, or 42 volts.

Furthermore, although switching means is provided separately from the engine controller in the above embodiment, for example, the engine controller can also include additional switching means so that engine controller and switching means are integrated.

Moreover, a discharge stop threshold value of the capacitor can be varied according to modes, for example of driving in city areas or at high-speeds, other vehicle speeds, and the amount the brakes are depressed. A predetermined voltage is always stored in the capacitor to use at a predetermined time and charging of the capacitor anytime.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A power generating and control system for a vehicle having an engine and a generator driven by said engine, said power generating and control system controlling a power generating state of the generator and comprising: a deceleration detector for detecting deceleration of the vehicle; a first power supply comprising a main battery for the vehicle connected in every operating state to said generator; a second power supply comprising a sub-battery for the vehicle, said second power supply being connected to said generator only when a power supply connecting condition is satisfied; and a switching arrangement preventing said generator from generating power when a charge quantity of said second power supply is greater than a predetermined value.

2. The power generating and control system according to claim 1, wherein said generator comprises an alternator driven by said engine.

3. The power generating and control system according to claim 1, wherein said vehicle comprises a hybrid vehicle, and said generator includes a motor generator with driving and power generating functions directly connected to an output shaft of said engine.

4. The power generating and control system according to claim 1, wherein said main battery comprises a 12 volt system battery, and said sub-battery comprises a capacitor.

5. The power generating and control system according to claim 1, wherein said vehicle includes an automatic stop/startup system, wherein said engine is automatically stopped when an automatic stop condition is satisfied during engine idling, and wherein said engine is automatically started and said switching arrangement is employed when an automatic startup condition is satisfied when said engine is stopped.

6. The power generating and control system of claim 1, wherein an idle switch is turned on and fuel is cut to said engine during deceleration of the vehicle.

7. The power generating and control system of claim 1, wherein, after said vehicle decelerates and said vehicle stops, said generator continues to apply charge to said sub battery.

8. The power generating and control system of claim 1, wherein said vehicle is a non-hybrid vehicle.

9. The power generating and control system of claim 1, wherein said switching arrangement senses when said power supply connecting condition is satisfied.

10. The power generating and control system of claim 9, wherein said power supply connecting condition is satisfied when said deceleration detector detects deceleration of said vehicle.

11. A power generating and control system for a vehicle having an engine and a generator driven by said engine, said power generating and control system controlling a power generating state of the generator and comprising: a deceleration detector arrangement for detecting deceleration of the vehicle; a first power supply comprising a main battery for the vehicle connected in every operating state to said generator; a second power supply comprising a sub-battery for the vehicle connected to said generator only when a power supply connecting condition is satisfied; a first switch section for connecting said generator and said second power supply only when said power supply connecting condition is satisfied; a second switch section for connecting said first and second power supplies only when a second said power supply connecting condition is satisfied; and a switching arrangement controlling said first and second switch sections so that said generator and said second power supply are not connected when said first and second power supplies are connected.

12. The power generating and control system of claim 11, wherein said main battery is connected in every operating state to receive power from said generator and in other operating states to receive power from or send power to said generator.

13. The power generating and control system of claim 11, wherein said switching arrangement senses when said power supply connecting condition is satisfied.

14. The power generating and control system of claim 13, wherein said power supply connecting condition is satisfied when said deceleration detector arrangement detects deceleration of said vehicle.

15. The power generating and control system of claim 11, wherein said vehicle comprises a hybrid vehicle.

16. The power generating and control system of claim 11, wherein said vehicle comprises a non-hybrid vehicle.

* * * * *